(12) United States Patent
Firdaus

(10) Patent No.: US 6,523,618 B2
(45) Date of Patent: Feb. 25, 2003

(54) TINE ASSEMBLY FOR A CULTIVATOR

(75) Inventor: Usman Firdaus, Strongsville, OH (US)

(73) Assignee: MTD Products Inc, Cleveland, OH (US)

(*) Notice: Subject to any disclaimer, the term of this patent is extended or adjusted under 35 U.S.C. 154(b) by 0 days.

(21) Appl. No.: 10/012,262

(22) Filed: Dec. 4, 2001

(65) Prior Publication Data

US 2002/0040795 A1 Apr. 11, 2002

Related U.S. Application Data

(62) Division of application No. 09/515,337, filed on Feb. 29, 2000, now Pat. No. 6,367,561.
(60) Provisional application No. 60/158,678, filed on Oct. 8, 1999.

(51) Int. Cl.[7] ............................................... A01B 21/02
(52) U.S. Cl. ....................................... 172/540; 172/604
(58) Field of Search ................................. 172/555, 540, 172/556, 604, 349, 123, 42, 60; 56/255, 295

(56) References Cited

U.S. PATENT DOCUMENTS

| 4,062,408 A | 12/1977 | Enters et al. |
| 4,133,390 A | 1/1979 | Reaume |
| 4,346,764 A | 8/1982 | Rossi |
| 4,421,176 A | 12/1983 | Tuggle et al. |
| 4,467,874 A | 8/1984 | Wittrock |
| 4,658,910 A | 4/1987 | Garriss |
| 5,299,647 A | 4/1994 | Mudd et al. |

FOREIGN PATENT DOCUMENTS

| DE | 28 34 057 A 1 | 2/1980 |
| DE | G 86 26 966.6 | 1/1987 |
| FR | 2 428 960 | 1/1980 |

OTHER PUBLICATIONS http://www.mantisgardentools.com/Mpages/fetures.htm, Issued Oct. 21, 1999.
http://www.mantisgardentools.com/Mpages/tiller.htm, Issued Oct. 21, 1999.
http://www.mantisgardentools.com/Mpages/accessor.htm, Issued Oct. 21, 1999.

Primary Examiner—Christopher J. Novosad
(74) Attorney, Agent, or Firm—Brouse McDowell; Roger D. Emerson; Timothy D. Bennett

(57) ABSTRACT

A tine assembly for a cultivator includes a first tine member having a plurality of radially extending non-planar tines. At least two tines on each tine member differ in shape from the remaining tines. The tine assembly may include a second tine member which is shaped like a mirror-image of the first tine member. When assembled on a shaft, the second tine member is off-set from the first tine member so that tines on alternating tine members contact the ground as the shaft rotates.

29 Claims, 12 Drawing Sheets

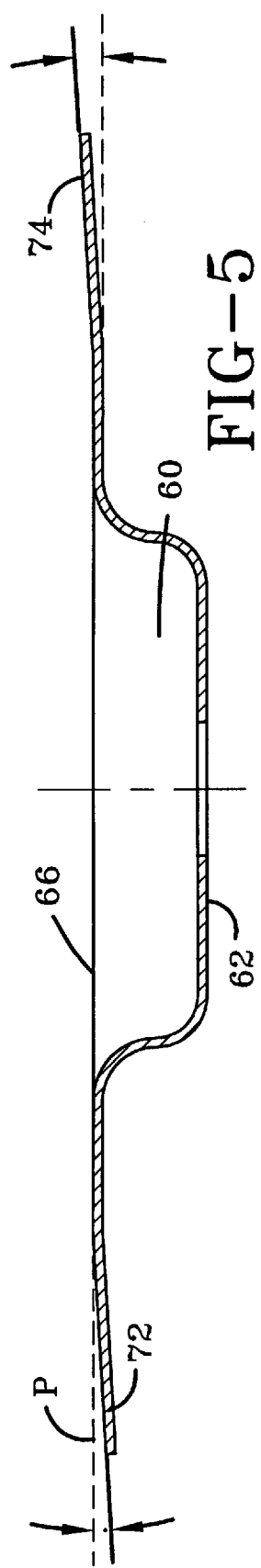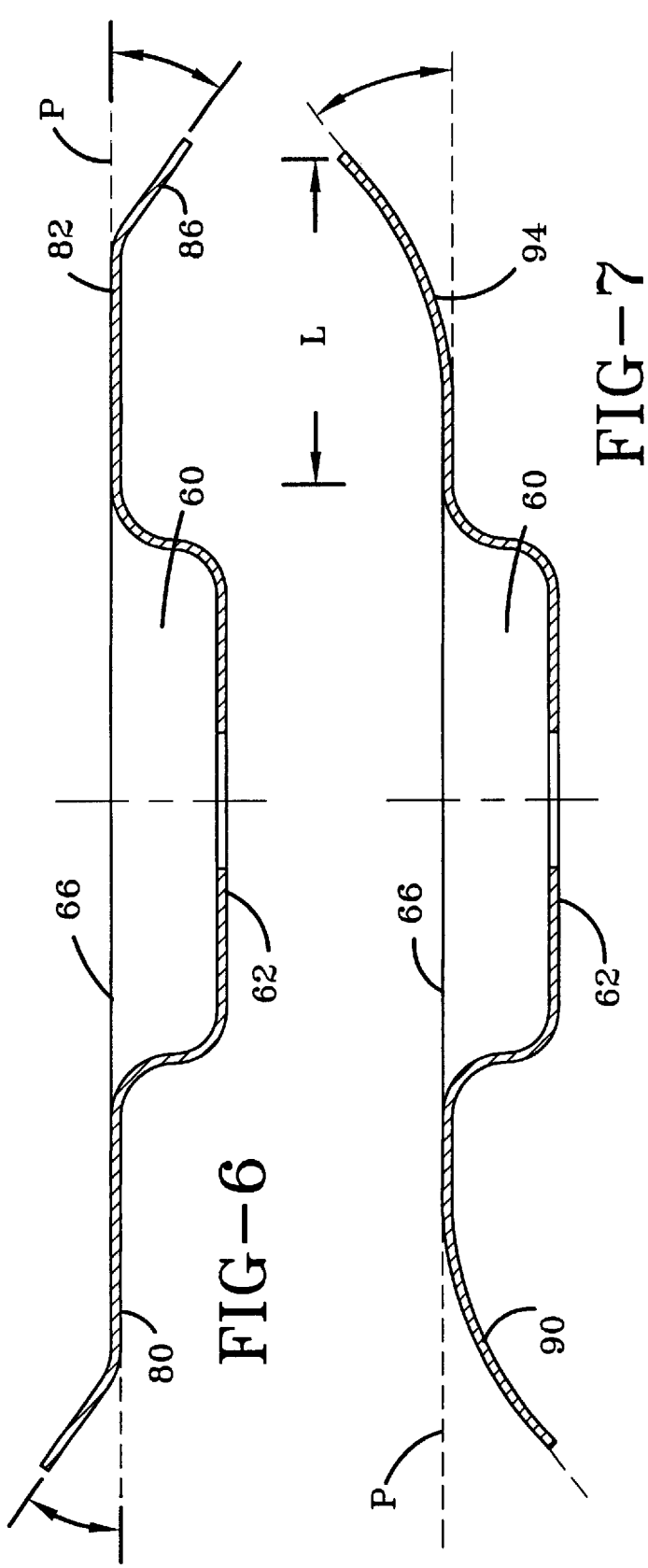

TINE ASSEMBLY FOR A CULTIVATOR

This application is a U.S. Divisional Patent Application that claims the benefit of U.S. Utility Patent Application Ser. No. 09/515,337, now U.S. Pat. No. 6,367,561B1, filed on Feb. 29, 2000, which claims the benefit of U.S. Provisional Application, Ser. No. 60/158,678, filed Oct. 8, 1999 in Express Mail Label No. EL43809441US by the same inventor, Usman Firdaus, entitled TINE ASSEMBLY FOR A CULTIVATOR.

FIELD OF THE INVENTION

This invention pertains to the art of methods and apparatuses for cultivators, tine assemblies for a cultivator, and tine members of a tine assembly, and more specifically to the construction and arrangement of tines on a tine member, the arrangement of tine members on one end of a rotatable cultivator shaft, and the arrangement of tine assemblies on first and second ends of a rotatable cultivator shaft.

BACKGROUND OF THE INVENTION

U.S. Pat. No. 5,299,647 discloses a tined rotary blade for cultivators having a pair of disk-like members. Each of the disk-like members includes a plurality of tines, specifically ten, projecting radially outwardly from a central region. The plurality of tine encompass 3 first tines which are each characterized by a simple curve whose free end portion is directed toward a common plane between the disk-like members. The plurality of tines further includes 3 second tines, which are each characterized by a compound curve wherein one portion of the tine is directed away from the common plane and another portion of the tine is directed toward the common plane. The plurality of tines further includes 3 third tines each characterized by a simple curve whose free end portion is directed away from the common plane. Lastly, the plurality of tines includes 1 fourth, planar tine which is oriented parallel to the common plane. Therefore, each disk-like member includes ten tines which are circumferentially displaced 36°. The tines on one disk-like member are offset from corresponding tines on the second disk-like member by 18°.

The addition of the fourth tine to the disk-like member is purportedly an improvement over other disk-like members known in the art which comprise nine tines having configurations similar to the first, second and third tines discussed above.

A rototiller with angularly disposed teeth is disclosed in U.S. Pat. No. 4,346,764. This rototiller has tines which include a first tooth fixed to one portion of the tine and a second tooth fixed to a second portion of the tine wherein the second portion is angularly disposed in relation to the first portion.

Other tine arrangements are set forth in U.S. Pat. Nos. 4,421,176; 4,467,874; 4,658,910; and 4,133,390.

SUMMARY OF THE INVENTION

In accordance with the present invention, a tine member is provided for use on the rotatable shaft of an associated cultivator.

Also in accordance with the invention, a tine assembly including a pair of tine members is provided for use on the rotatable shaft of an associated cultivator.

Also in accordance with the invention, a cultivator using one to four tine members and any combination thereof is provided.

According to one aspect of the invention, a tine member comprises a hub including a base having a central bore through which the rotatable shaft extends and a rim disposed about the base and lying in a first plane, P, and a plurality of tines, each of the tines projecting generally radially outward from the rim, and wherein each tine includes a leading edge, a trailing edge, and a tip, the plurality of tines including a first tine characterized by a series of notches formed in the leading edge thereof.

According to another aspect of the invention, the first tine is bent at a first angle, $\alpha_1$, relative to plane P.

According to another aspect of the invention, the tine member includes two of the first tines.

According to another aspect of the invention, one of the first tines is bent at a first angle, $\alpha_1$, relative to plane P, and the other first tine is bent generally at an equal and opposite angle, $\alpha_2$, relative to plane P.

According to another aspect of the invention, the tips of the first tines are circumferentially offset by substantially 180°.

According to another aspect of the invention, the plurality of tines further includes a second tine characterized by a generally planar shank portion lying in plane P and a bent end portion.

According to another aspect of the invention, the plurality of tines further includes two second tines wherein the end portion of one of the second tines is bent at an angle $\beta_1$ relative to plane P, and the end portion of the other second tine is bent at a substantially equal and opposite angle $\beta_2$ relative to plane P.

According to another aspect of the invention, the tip of one of the second tines is circumferentially offset by substantially 90° relative to the tip of one of the first tines.

According to another aspect of the invention, the tips of the second tines are circumferentially offset by substantially 180°.

According to another aspect of the invention, the plurality of tines further includes a third tine characterized by a curved shank.

According to another aspect of the invention, the tine member includes first and second pairs of third tines wherein the shank of each of the first pair of third tines is generally curved in a first direction relative to plane P and the shank of each of the second pair of third tines is generally curved in an opposite direction relative to plane P.

According to another aspect of the invention, the tips of the first pair of third tines are circumferentially offset by substantially 90° and the tips of the second pair of third tines are circumferentially offset by substantially 90°.

According to another aspect of the invention, the tip of one of the first pair of third tines is circumferentially offset from the tip of one of the second pair of third tines substantially 180°.

According to another aspect of the invention, the tips of adjacent tines are circumferentially offset by substantially 45°.

According to another aspect of the invention, the tines are disposed in the sequence of one of the first tines, one of the first pair of third tines, one of the second tines, the other one of the first pair of third tines, the other first tine, one of the second pair of third tines, the other second tine, and the other one of the second pair of third tines.

According to another aspect of the invention, the base of the tine member is disposed in a plane parallel to and spaced from plane P.

According to another aspect of the invention, one of the first tines is bent at an angle toward the plane of the base and the other first tine is bent at an angle away from the plane of the base.

According to another aspect of the invention, the bent end portion of one of the second tines is disposed toward the plane of the base and the bent end portion of the other second tine is disposed away from the plane of the base.

According to another aspect of the invention, the shanks of each of the first pair of third tines is curved toward the plane of the base and the shanks of each of the second pair of third tines is curved away from the plane of the base.

According to another aspect of the invention, a tine assembly is provided for mounting on the rotatable shaft of an associated cultivator. The tine assembly comprises a first tine member including a hub having a generally planar base having a central bore through which the associated shaft extends and a generally planar rim being associated with a first plane, P; and, a plurality of tines, each of the tines projecting generally radially outward from the rim, and wherein each tine includes a leading edge, a trailing edge, and a tip, the plurality of tines including a first tine characterized by a series of notches formed in the leading edge thereof; a second tine member having a structure essentially similar to an image formed by reflection of the first tine member in a mirror placed parallel to the base whereby the second tine member includes a corresponding hub having a generally planar base having a central bore through which the associated shaft extends and a generally planar rim; and a plurality of corresponding tines projecting radially outward from the rim, and wherein each tine includes a leading edge, a trailing edge, and a tip, the plurality of corresponding tines including a first tine characterized by a series of notches formed in a leading edge thereof; and, means for mounting the first and second tine members onto the shaft in a predetermined relative position.

According to another aspect of the invention, the tips of corresponding tines on the first and second tine members are circumferentially offset by at least 22.5°.

According to another aspect of the invention, the tips of corresponding tines on the first and second tine members are circumferentially offset by at least 90°.

According to another aspect of the invention, the mounting means comprises a first adapter having a body with an axial opening, a planar first surface, an opposite planar second surface, and an axial flange extending from the first surface through the central bore of the first tine member; and, a second adapter having a body with an axial opening, a planar first surface, an opposite planar second surface, an axial flange extending from the first surface through the central bore of the second tine member, and an axial spacer extending from the second surface through the axial opening of the first adapter.

According to another aspect of the invention, the body of the first adapter is generally triangular and the body of the second adapter is generally triangular and the apices of the triangular body of the first adapter are offset from the apices of the triangular body of the second adapter by approximately 60°.

According to another aspect of the invention, the mounting means further comprises first means for mounting the first adapter to the first tine member, the first means extending through the apices of the triangular body of the first adapter; and, second means for mounting the second adapter to the second tine member, the second means extending through the apices of the triangular body of the second adapter.

According to another aspect of the invention, a cultivator is provided including powering means and transmission means for transferring power from the powering means to a rotatable shaft which rotates about an axis. The cultivator comprises:

a first tine assembly positioned at a first end of the shaft, the first tine assembly including a first tine member, a second tine member, and first means for mounting the first and second tine members to the shaft in a predetermined relative position wherein the first tine member comprises a hub including a generally planar base having a central bore through which the shaft extends and a generally planar rim being associated with a plane P and a plurality of tines, each of the tines projecting generally radially outward from the rim, and wherein each tine includes a leading edge, a trailing edge, and a tip, the plurality of tines including a first tine characterized by a series of notches formed in the leading edge thereof; and wherein the second tine member has a structure essentially similar to an image formed by reflection of the first tine member in a mirror place parallel to the base whereby the second tine member includes a hub having a generally planar base having a central bore through which the shaft extends and a generally planar rim, and a plurality of corresponding tines projecting generally radially outward from the rim, and wherein each tine includes a leading edge, a trailing edge and a tip, the plurality of corresponding tines including a first tine characterized by a series of notches form in the leading edge thereof; and, a second tine assembly positioned at the second end of the shaft, the second tine assembly including a third tine member, a fourth tine member, and second means for mounting the third and fourth tine members to the shaft in a predetermined relative position wherein the third tine member is essentially identical in structure to the first tine member, and the fourth tine member is essentially identical in structure to the second tine member.

According to another aspect of the invention, the positioning of first tine assembly on the first end of the shaft is offset by 180° as compared to the positioning of the second tine assembly on the second end of the shaft.

According to another aspect of the invention, the first mounting means includes a first adapter having a body with an axial opening, a planar first surface, an opposite planar second surface, and an axial flange extending from the first surface through the central bore of the first tine member; and, a second adapter having a body with an axial opening, a planar first surface, an opposite planar second surface, an axial flange extending from the first surface through the central bore of the second tine member, and an axial spacer extending from the second surface through the axial opening of the first adapter; and, the second mounting means includes a third adapter having a body with an axial opening, a planar first surface, an opposite planar second surface, an axial flange extending from the first surface through the central bore of the third tine member, and an axial spacer extending from the second surface; and, a fourth adapter having a body with an axial opening, a planar first surface, an opposite planar second surface, and, an axial flange extending from the first surface through the central bore of the fourth tine member, wherein the axial spacer of the third adapter extends through the axial opening of the fourth adapter.

One advantage of the present invention is the inclusion of the slasher-type tine on the tine member which provides improved root cutting.

Another advantage of the present invention is the arrangement of tines on the tine member which provides improved soil break-up.

Another advantage of the present invention is the unique mounting system which allows for easy conversion from the use of one, two, three, or four tine members on the rotating cultivator shaft.

Still other advantages of the present invention will be apparent to those skilled in the art after a reading and understanding of the specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 5 is a sectional view of the tine member shown in FIG. 4 taken along the line 5—5;

FIG. 6 is a sectional view of the tine member shown in FIG. 4 taken along the line 6—6;

FIG. 7 is a sectional view of the tine member shown in FIG. 4 taken along the line 7—7;

DESCRIPTION OF THE PREFERRED EMBODIMENT

Figure 1:
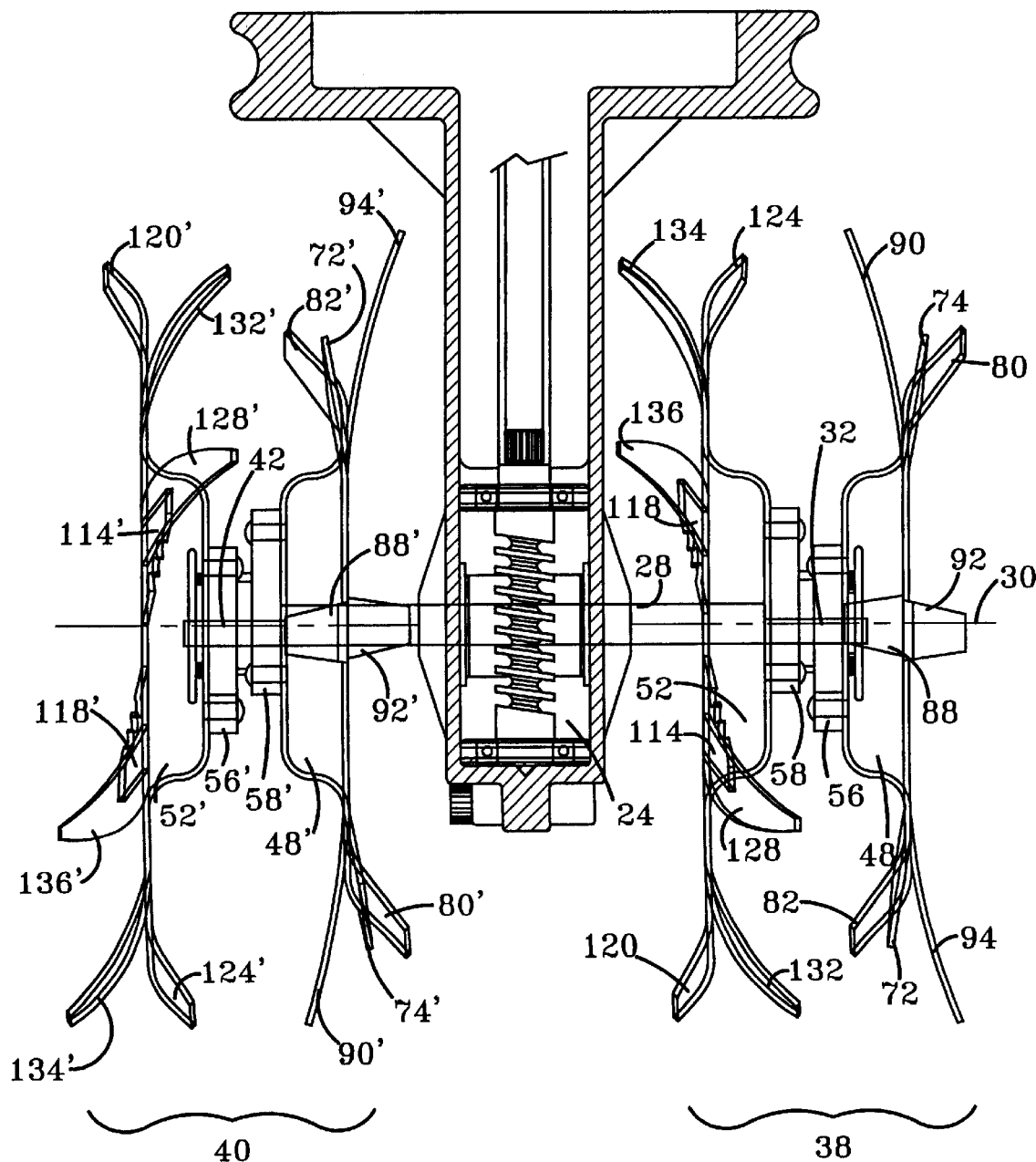
FIG. 1 is a front partial view of a cultivator having a tine assembly according to the present invention.
Figure 2:
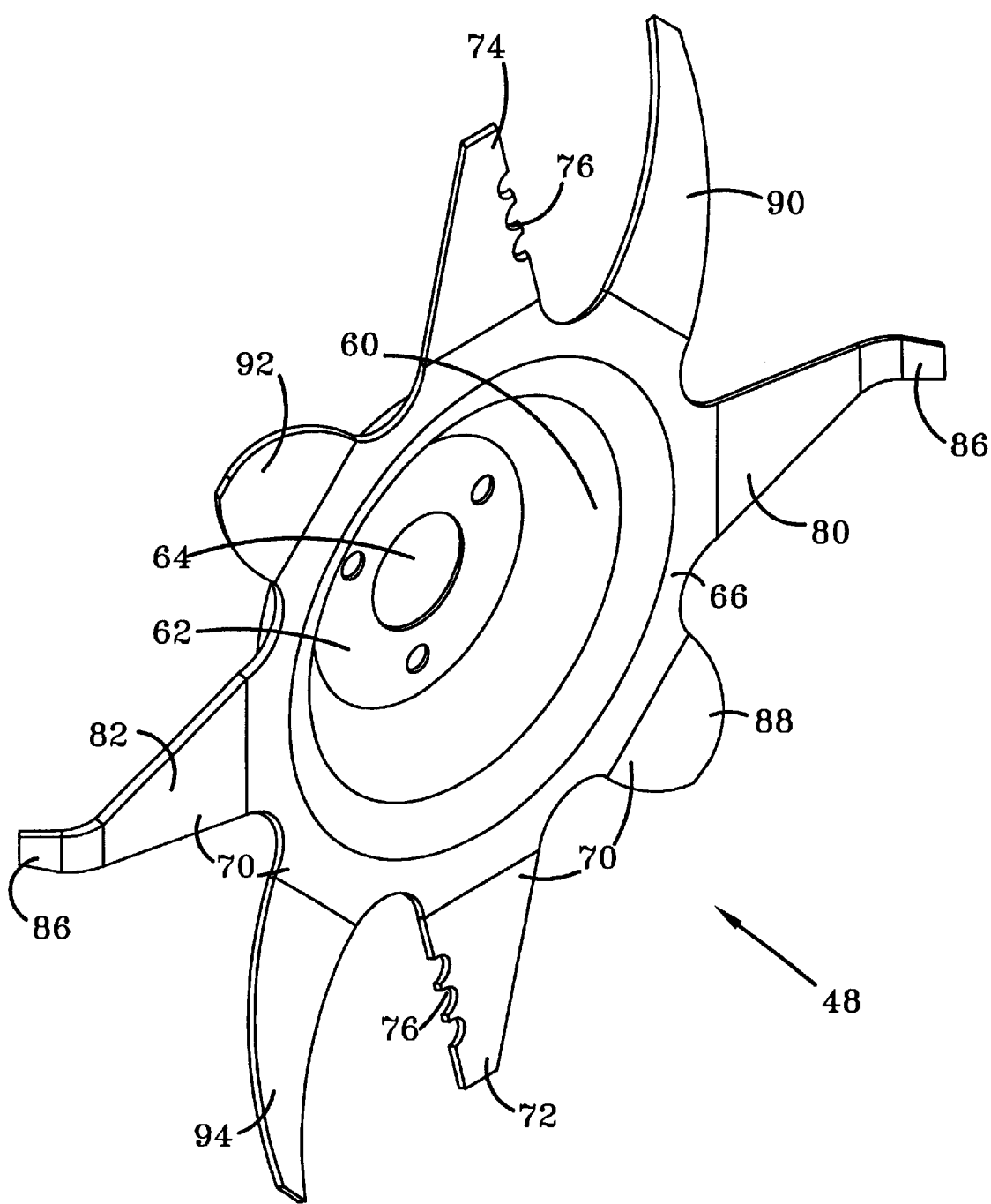
FIG. 2 is a perspective view of a first tine member according to the invention.
Figure 3:
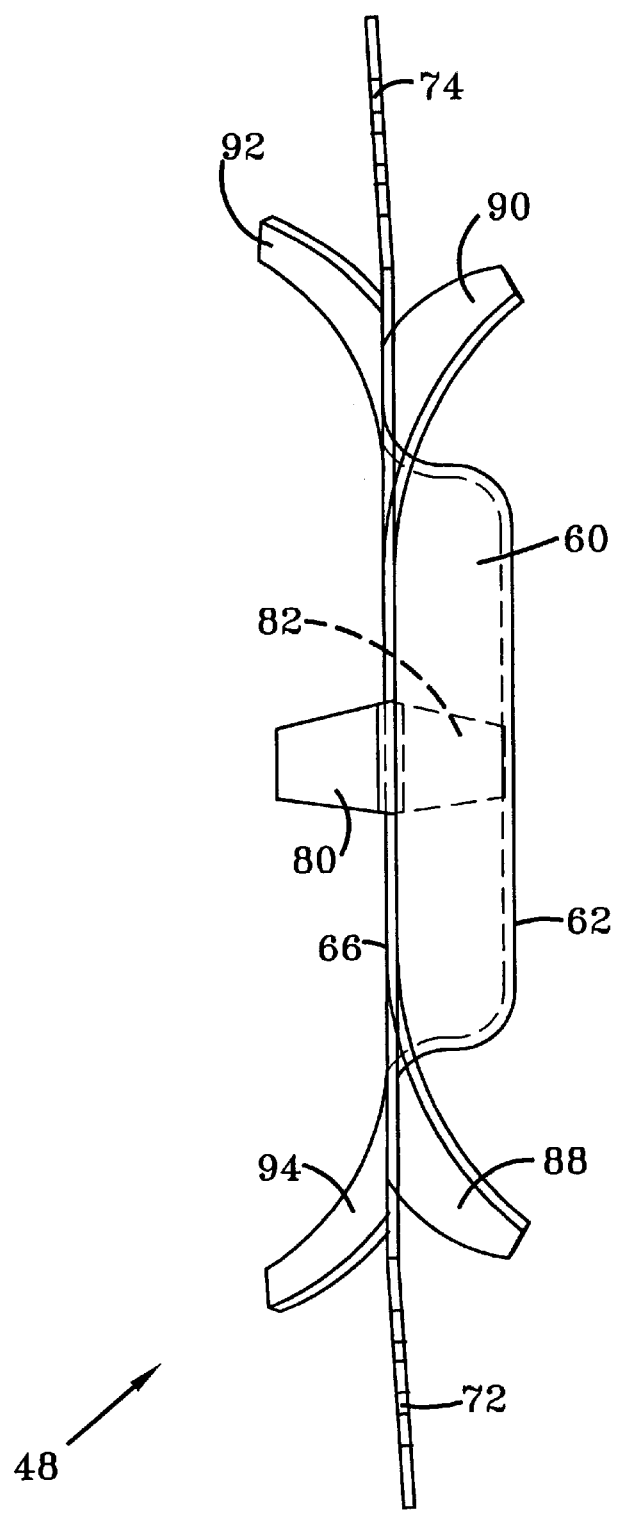
FIG. 3 is a side view of the tine member shown in FIG. 2 taken along the sight line of the arrow.

FIGS. 1–18 are directed to the preferred embodiments of the present invention. With particular reference to FIG. 1, the present invention is provided for use with a cultivating implement referred to generally as cultivator 20. The cultivator 20 employs powering means such as an engine, not shown, and transmission means 24 for transferring the power from the powering means to a rotatable shaft 28 in ways well known in the art. Shaft 28 rotates about an axis 30. Located near a first end 32 of shaft 28 is a first tine assembly 38. A second tine assembly 40 is located near a second end 42 of shaft 28. The tine assemblies 38, 40 are fixedly secured to shaft 28 and rotatable therewith. In one preferred embodiment, the first tine assembly 38 includes a first tine member 48, a second tine member 52, first adapter 56 and second adapter 58. The second tine assembly 40 also includes a first tine member 48', a second tine member 52', first adapter 56' and second adapter 58'. The "prime" symbols are utilized because in the preferred embodiment, the corresponding parts are identical in appearance, but disposed in different relative positions on shaft 28, as will be explained in further detail later in this disclosure.

A preferred embodiment of first tine member 48 will now be described with reference to FIGS. 2–7. First tine member 48 includes a cupped hub 60 including base 62 having a central bore 64 through which shaft 28 extends. When assembled, base 62 is disposed in a plane essentially perpendicular to the axis 30 of shaft 28. Axially spaced from base 62 is rim 66 from which extends a plurality of radially disposed tines 70. Rim 66 also lies in a plane, P, essentially perpendicular to axis 30.

Figure 4:
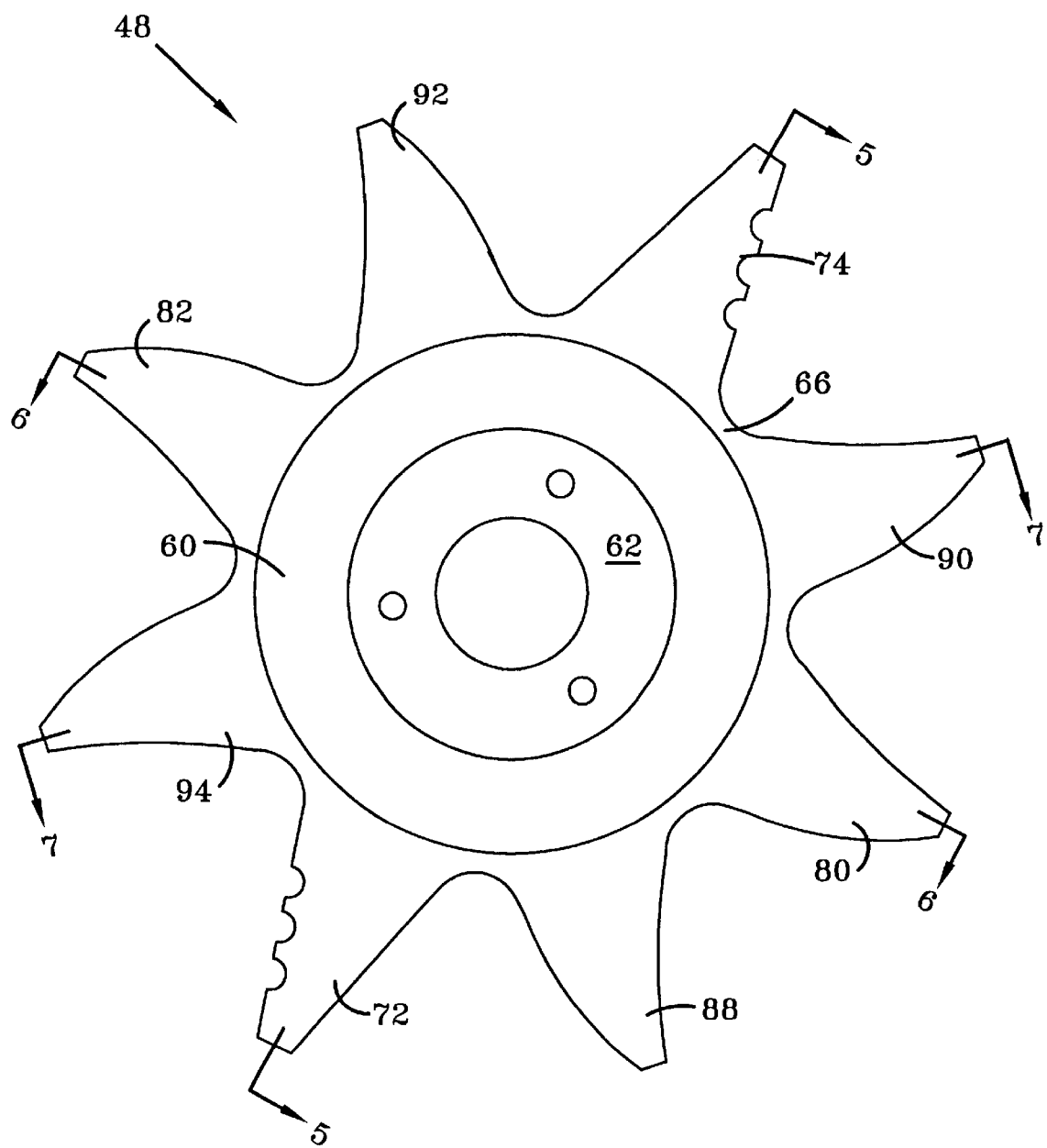
FIG. 4 is a front view of the tine member shown in FIG. 2.

In the preferred embodiment, tines 70 encompass three different shapes. Slasher tines 72, 74 are identified by series of notches formed in the leading edge 76. Bolo tines 80, 82 are identified by a sharply bent end 86. Curved tines 88, 90, 92, and 94 are identified by a gradual curve along the length of each tine. In the preferred embodiment, there are eight tines 70 radially extending from rim 66 at approximately 45° intervals. In the preferred embodiment, slasher tines 72, 74 are generally disposed at 180° to each other. Likewise, bolo tines 80, 82 are generally disposed at 180° to each other and 90° to the slasher tines 72, 74. Intermediate the slasher tines 72, 74 and the bolo tines 80, 82 are the curved tines 88, 90, 92, and 94. For example, in one embodiment, the order of tines 70 is slasher 72, curved tine 94, bolo tine 82, curved tine 92, slasher 74, curved tine 90, bolo tine 80, and curved tine 88, as best shown in FIG. 4.

With particular reference to FIGS. 3 and 5–7, a preferred configuration of tines is shown. None of the tines lies completely in the plane P that contains rim 66. Some of the tines extend "upwardly", away from base 62, while other tines extend "downwardly", toward base 62. In the preferred embodiment, one slasher tine, for example slasher 72, extends downwardly, while the other slasher tine, for example slasher 74, extends upwardly. Further, in the preferred embodiment, one bolo tine, for example bolo 80, extends upwardly, while the other bolo tine, for example bolo 82, extends downwardly. Two of the curved tines, for example curved tines 92 and 94 extend upwardly, and the other two curved tines, for example 88 and 90 extend downwardly. As shown in the cross-sectional views (FIGS. 5–7) the "upwardly" and "downwardly" extending tines of a given shape are positioned at 180° to each other. There are two such pairs of curved tines, for example curved tine 90 extends downwardly and is oppositely positioned to curved tine 94, which extends upwardly. Likewise, curved tine 88 extends downwardly and is oppositely positioned to curved tine 92 which extends upwardly. The description of a preferred order of the tines 70 can be modified as follows: slasher 72 (down), curved tine 94 (up), bolo tine 82 (down), curved tine 92 (up), slasher 74 (up), curved tine 90 (down), bolo tine 80 (up), and curved tine 88 (down).

As shown in FIG. 5, the slasher tines 72, 74 deviate from plane, P, at a slight angle preferably between ±5° and 15°, most preferably about ±10°.

As shown in FIG. 6, the end 86 of each bolo tine 80, 82 deviates from plane P at an angle greater than the "slasher angle" and is preferably between ±45° and 60°, most preferably between ±50° and 55°.

As shown in FIG. 7, each of the curved tines 88, 90, 92, 94 are gradually curved along its length, L, until the tine forms an angle of preferably between ±20° to 45° with plane P, and most preferably between ±25° to 35°.

Figure 8:
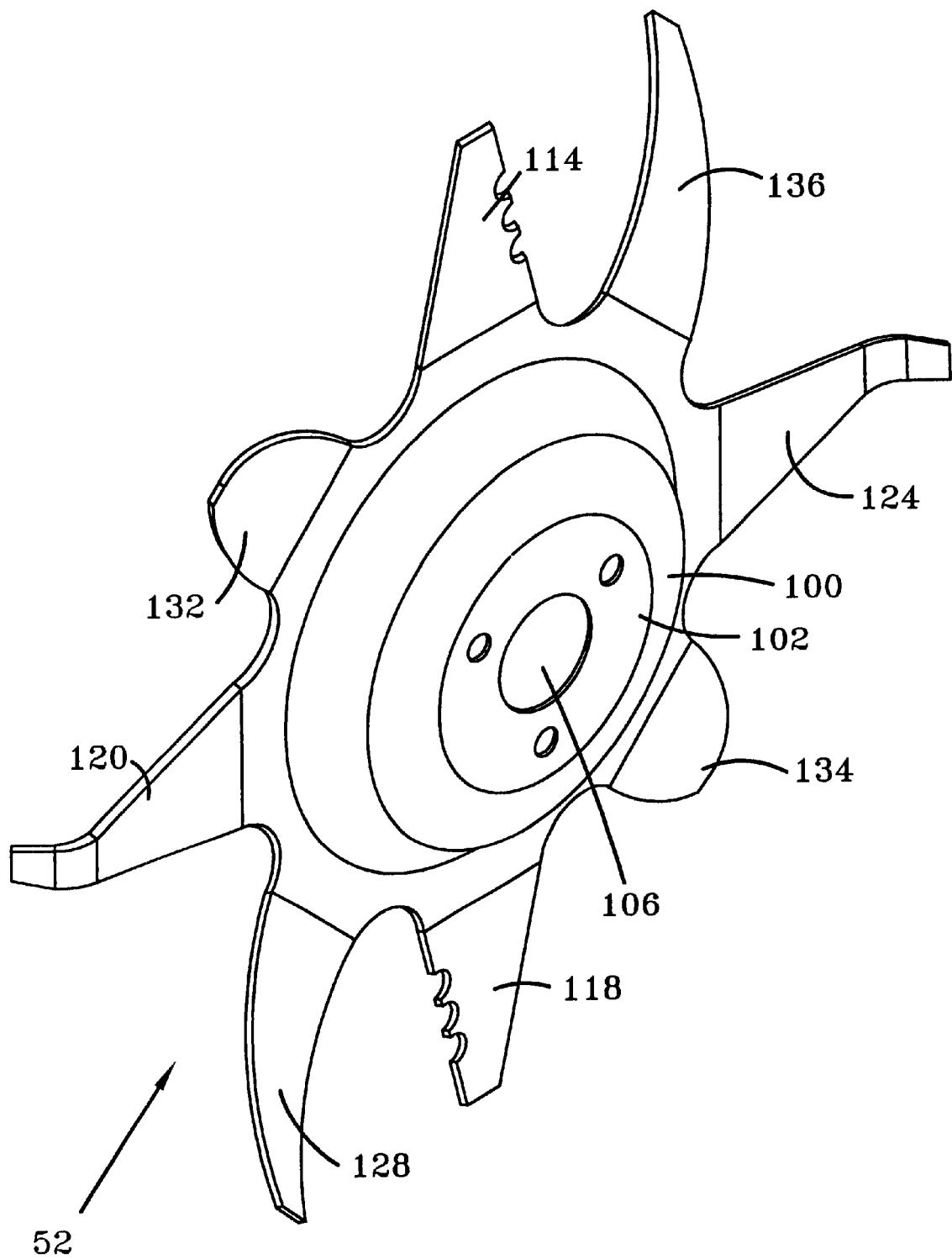
FIG. 8 is a perspective view of a second tine member according to the invention.

With reference now to FIGS. 1 and 8, second tine member 52 will be described. In the preferred embodiment, second tine member 52 is not identical to first tine member 48, but is a mirror image thereof reflected in a mirror placed parallel to base 62. For example, cupped hub 100 would appear to be oppositely oriented than hub 60 and the reflection of bolo 80 (first tine member 48) would be bolo 120 on second tine member 52. Bolo 120 is therefore classified as extending "upwardly" away from base 102. As best shown in FIG. 1, however, bolo 120 is oriented in an opposite direction to bolo 80 when assembled on shaft 28, because the respective hubs 100 and 60 occupy reversed positions on shaft 28. The preferred order of tines on the second tine member 52 is slasher 114 (down), curved tine 136 (up), bolo tine 124 (down), curved tine 134 (up), slasher 118 (up), curved tine 128 (down), bolo tine 120 (up), and curved tine 132 (down).

Figure 9:
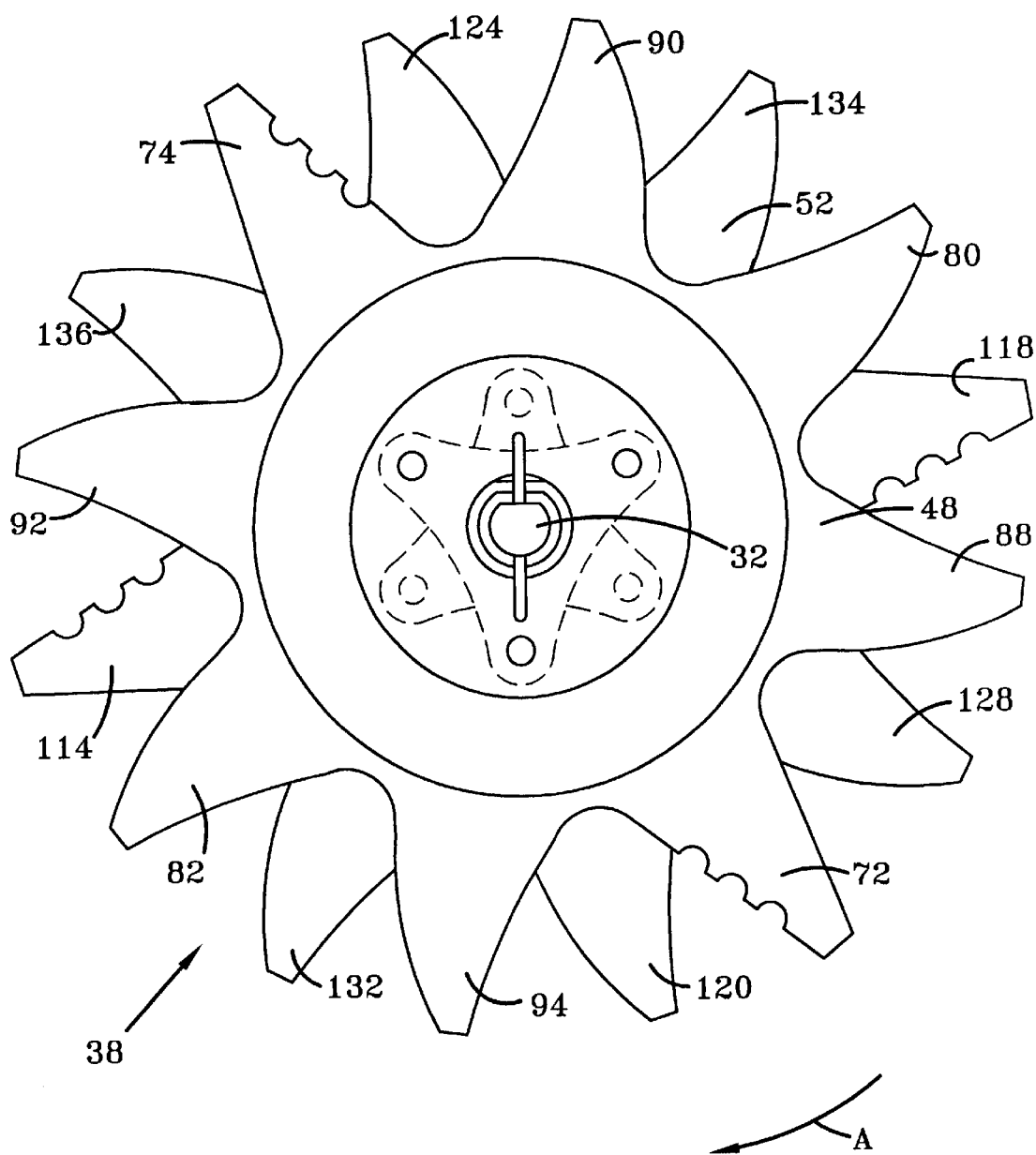
FIG. 9 is a first end view of a shaft showing a first tine assembly according to the invention.

With reference to FIG. 9, an end view of first tine assembly 38 is shown. In the preferred embodiment, the relative positioning of first tine member 48 to second tine member 52 is fixed. The preferred arrangement, shown in FIG. 9, illustrates that second tine member 52 occupies a position found by rotation of the reflected image of the first tine member 48 through approximately 112.5° in a clockwise direction, which is approximately 5/16 of a circle. Each of the tines of second tine member 52 are offset approximately 22.5° from the tines of the first tine member 48.

Figure 10:
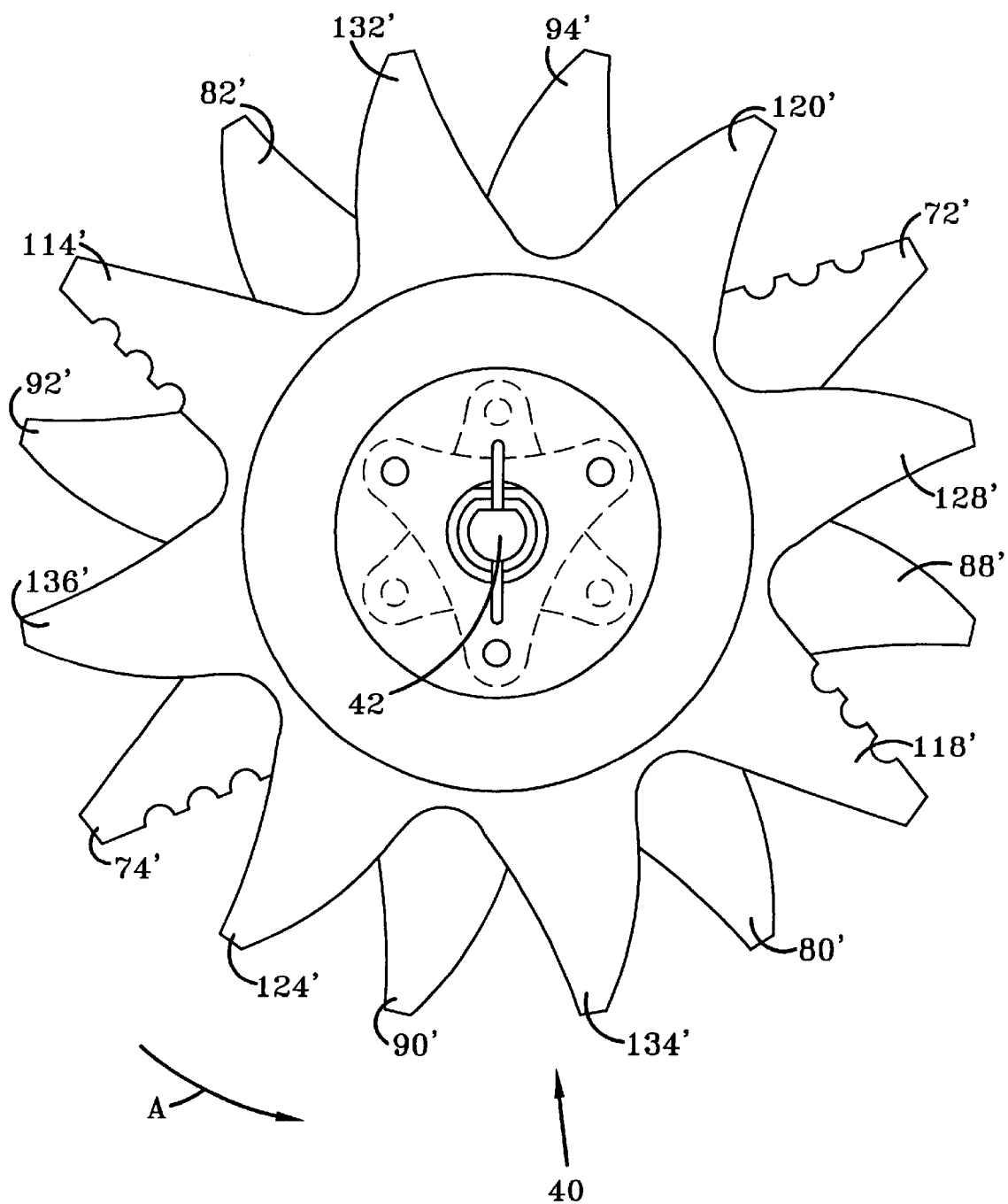
FIG. 10 is a second end view of the shaft showing a second tine assembly according to the invention.

With particular reference to FIGS. 1 and 10, the preferred arrangement of second tine assembly 40 will be described. Third tine member 48' is identical in appearance to first tine member 48. Likewise, fourth tine member 52' is identical in appearance to second tine member 52. The fixed positioning of fourth tine member 52' relative to third tine member 48' is likewise identical to the positioning of second tine member 52 to first tine member 48 in terms of a reflected mirror image being rotated 112.5°. However, on shaft 28, the second tine assembly 40 is arranged so that third tine member 48' is rotated 120° with respect to the first tine member 48 and fourth tine member 52' is rotated 120° with respect to second tine member 52. The arrangement of third adapter 56' and fourth adapter 58' will be described later in this disclosure.

An opposite end view showing second tine assembly 40 is given in FIG. 10 where members corresponding to like members of first tine assembly 38 are denoted by primed reference numerals.

Figure 11:
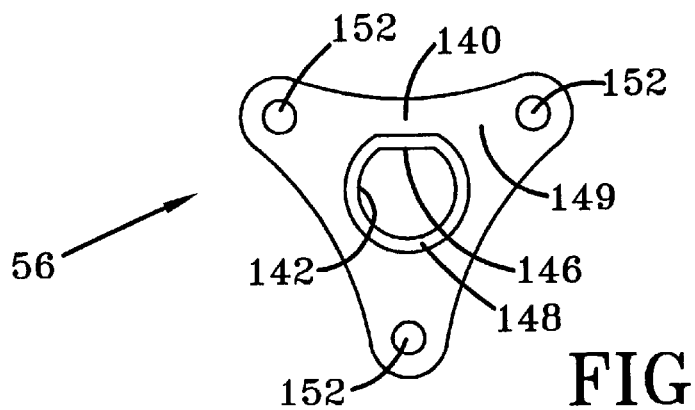
FIG. 11 is a first end view of a first adapter.
Figure 12:
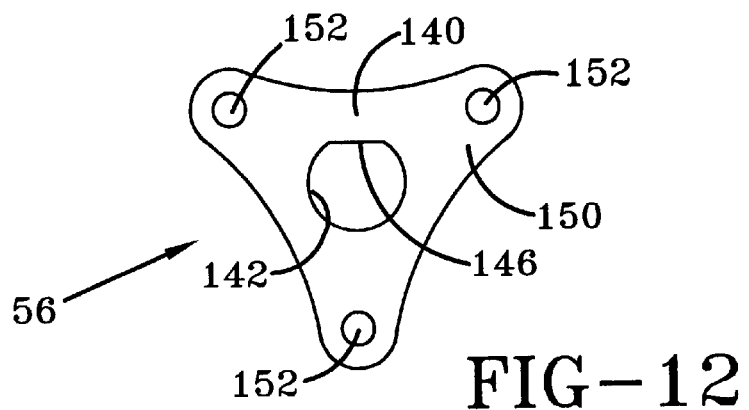
FIG. 12 is a second end view of the first adapter.
Figure 13:
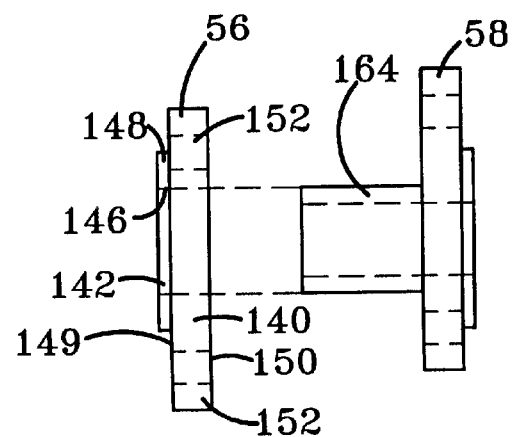
FIG. 13 is a side view of the first adapter shown in FIG. 11 and a second adapter.

The relative positioning of the tine members 48, 52, with respect to each other and shaft 28 is provided by first adapter 56 and second adapter 58. First adapter 56 is best seen in FIGS. 11–13. The preferred embodiment of first adapter 56 includes a triangular body 140 having an axial opening 142. The opening 142 is generally circular but includes a flattened region 146. A first side of the first adapter 56 includes a flange 148 extending from a generally planar surface 149. In the preferred embodiment, a second side of the first adapter 56 comprises an essentially planar surface 150. Near the apices of the triangular body 140, means are provided for fixedly securing the first adapter 56 to first tine member 48 in a predetermined position. In a preferred embodiment, rivets or other fasteners (not shown in these views) extend through holes 152 in the triangular body 140 through corresponding holes in the first tine member 48. Flange 148 extends though the central bore 64 in the first tine member 48. As will be discussed later in this disclosure, the diameter of the generally circular opening 142 is greater than the diameter of first end 32 of shaft 28.

Figure 14:
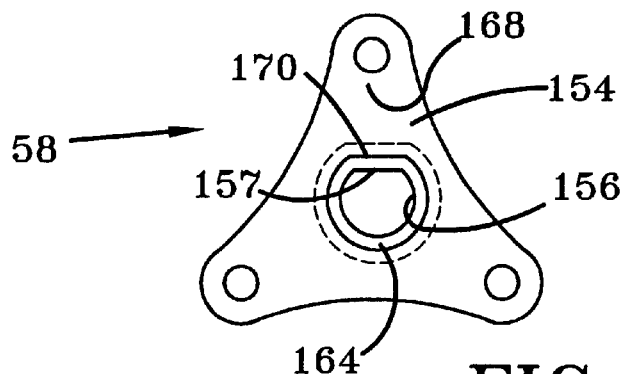
FIG. 14 is a first end view of the second adapter.
Figure 15:
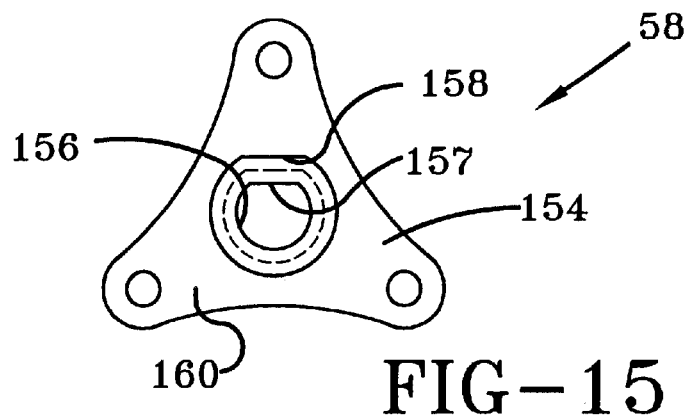
FIG. 15 is a second end view of the second adapter.
Figure 16:
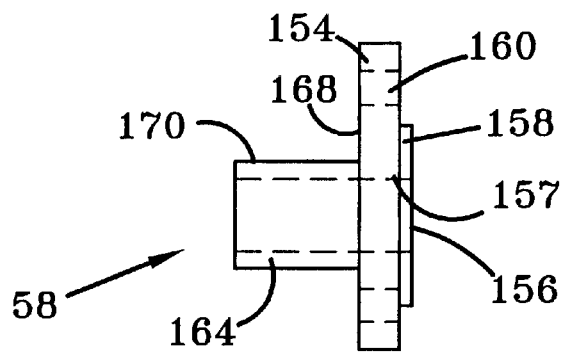
FIG. 16 is a side view of the second adapter shown in FIG. 14.

With reference to FIGS. 14–16, second adapter 58 also includes a triangular body 154 with axial opening 156. One side of body 154 includes flange 158 extending from a generally planar surface 160. The axial opening 156 includes a flattened region 157 and is dimensioned to receive first end 32 of shaft 28. The opposite side of body 154 includes a spacer 164 extending from a generally planar surface 168. Spacer 164 is dimensioned to be received through axial opening 142 in first adapter 56, as best illustrated in FIG. 13, including a flat surface 170 which mates with the flattened region 146 of opening 142. Near the apices of body 154 means are provided for fixedly securing the second adapter 58 to second tine member 52 in a predetermined position in a manner similar to that described above with reference to first adapter 56 and first tine member 48.

Figure 17:
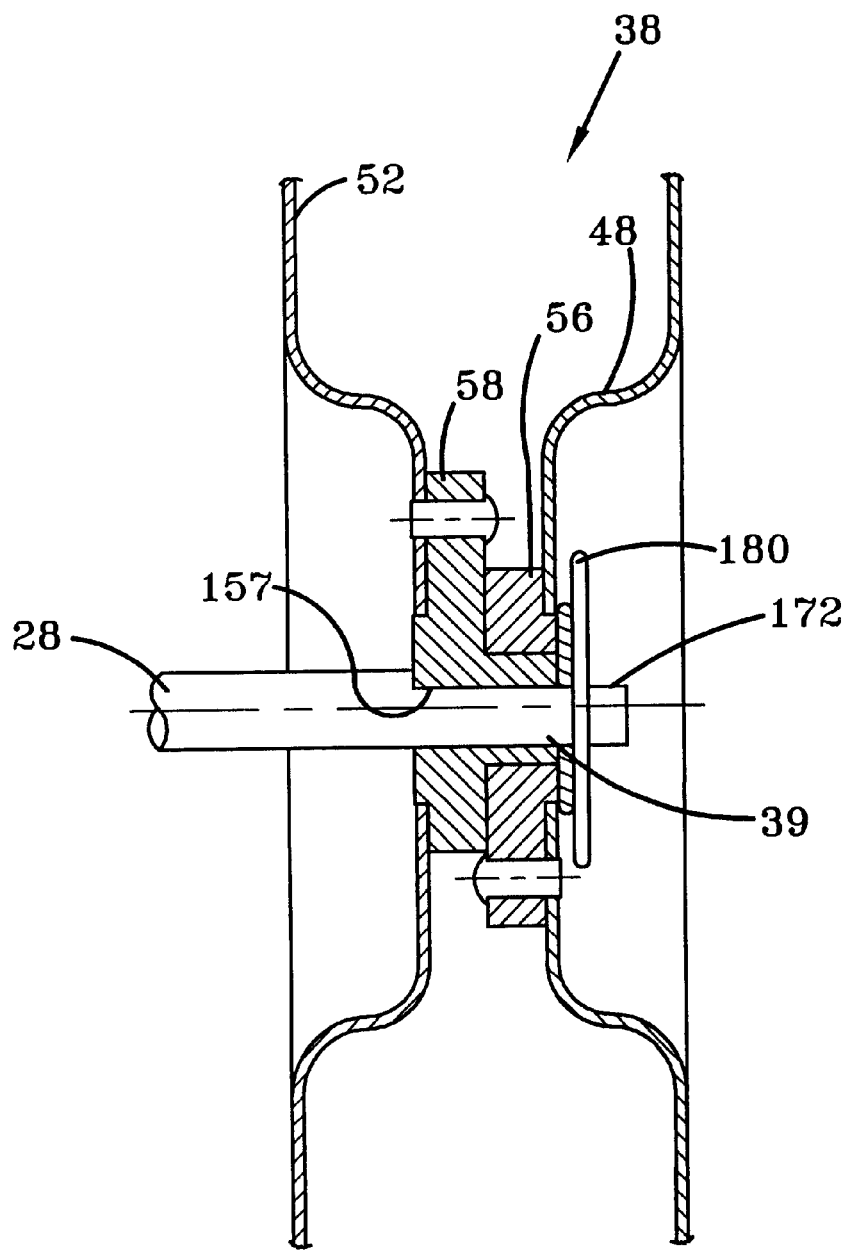
FIG. 17 is a partial sectional view of the first tine assembly.

FIG. 17 shows a preferred arrangement of first tine assembly 38 on the first end 32 of shaft 28. As illustrated, the dimension of shaft 28 is reduced at first end 32 due to a flattened surface 172 which mates with flattened region 157 in the axial opening 156 of spacer 164. In a preferred embodiment, pin member 180 secures first tine assembly 38 to shaft 28, although other fastening means can be employed within the scope of the present invention.

Figure 18:
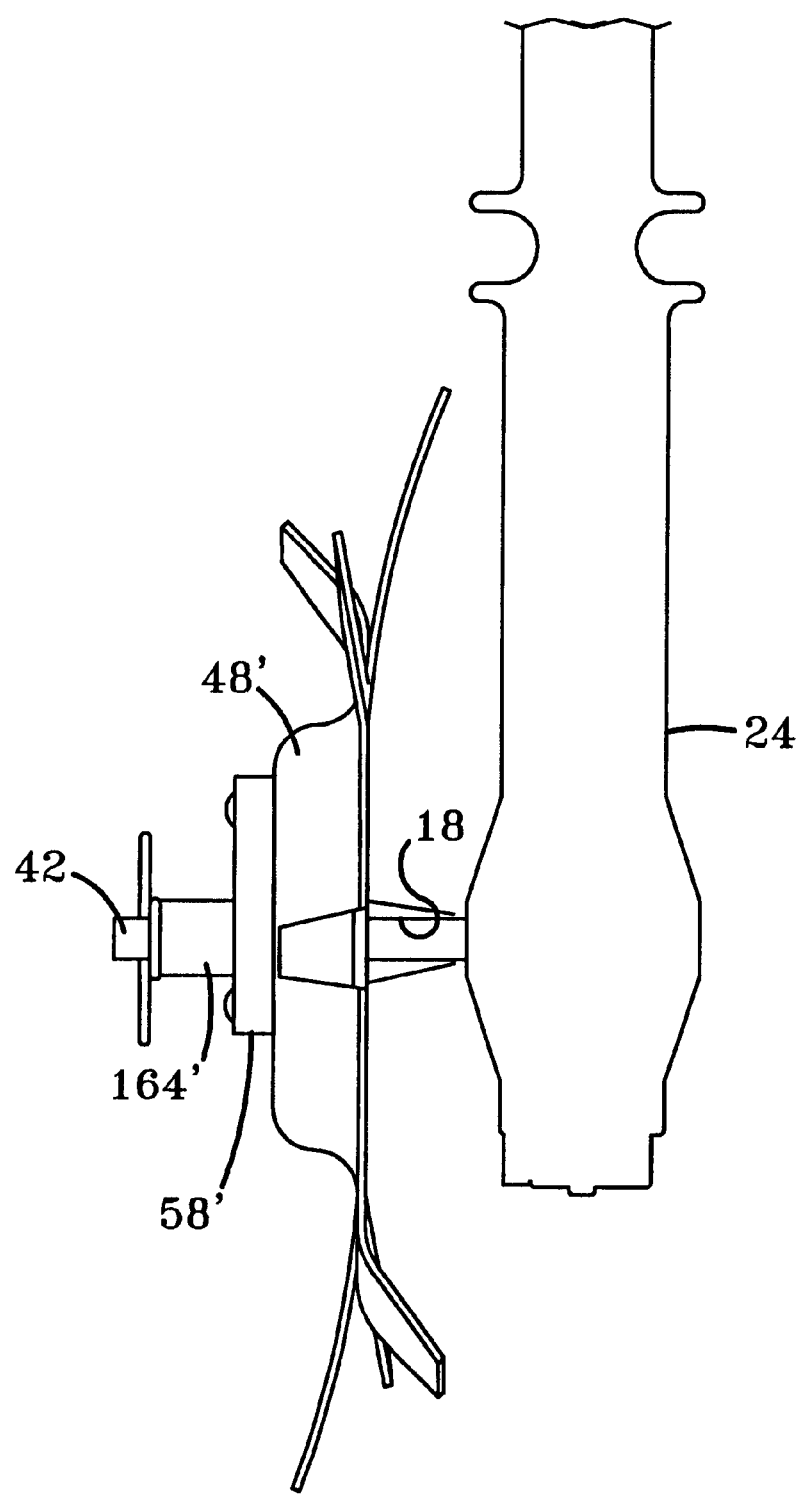
FIG. 18 is a partial front view showing a further embodiment of the invention.

With reference to FIG. 1, adapter 56 is adjacent first tine member 48 which is located on the first outside end of cultivator 20. At the second outside end a similar adapter 56' is utilized to hold fourth tine member 52' on second end 42 of shaft 28. In this way, the adapters 58, 58' with the spacers 164, 164' are located axially inwardly of the adapters 56, 56' on each end of shaft 28. This design allows for the removal of one or two tine members during operation of the cultivator 20 without the need for changing the fastening means. FIG. 18 shows the second end 42 of the shaft 28 with only third tine member 48'. The cultivator can be operated with one, two, three or four tine members in place. The design of the shaft ends 32, 42, and adapters 56, 56', 58, 58' prevent an operator from mis-placing the various parts on the shaft 28.

With reference again to FIGS. 1 and 9, the first tine assembly 38 rotates in the direction of the arrow A. As shown, the ground will be contacted by tines on alternating tine members. For example, in this preferred embodiment, starting with slasher 72, the order of contact would be: first tine member (ftm) slasher 72 (down), second tine member (stm) curved tine 128 (down), ftm curved tine 88 (down), stm 118 (up), ftm bolo tine 80 (up), stm curved tine 134 (up) ftm curved tine 90 (down), stm bolo tine 124 (down), ftm slasher 74 (up), stm curved tine 136 (up), ftm curved tine 92 (up), stm slasher 114 (down), ftm bolo tine 82 (down), stm curved tine 132 (down), ftm curved tine 94 (up), and stm bolo 120 (up). Because of the arrangement of the tine members 48, 52 on shaft 28, when assembled, the term "up" means the tines of one tine member are angled away from the other tine member and the term "down" means that the tines of one tine member are angled toward the other tine member. As shaft 28 rotates, both tine assemblies 38, 40 rotate. In the preferred embodiment, bolo 80' contacts the ground in sync with slasher 72. The order of contact of the tines of second tine assembly 40 is readily apparent from FIG. 10.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

What is claimed is:

1. A tine member adapted for mounting on an associated rotatable shaft of an associated cultivator, the tine member comprising:

a hub including a generally planar base having a central bore through which the associated shaft extends and a generally planar rim being associated with a first plane, P; and, a plurality of tines, each of the tines projecting generally radially outward from the rim, and wherein each tine includes a leading edge, a trailing edge, and a tip, the plurality of tines including a first tine characterized by a series of notches formed in the leading edge thereof.

2. The tine member of claim 1 wherein the first tine is bent at a first angle, $\alpha_1$, relative to plane P.

3. The tine member of claim 2 wherein $\alpha_1$ is between 5° and 15°, inclusive.

4. The tine member of claim 1 comprising two first tines.

5. The tine member of claim 4 wherein one of the first tines is bent at a first angle, $\alpha_1$, relative to plane P, and the other first tine is bent at a substantially equal and opposite angle, $\alpha_2$, relative to plane P.

6. The tine member of claim 5 wherein the plurality of tines further includes two second tines each characterized by a generally planar shank portion lying in plane P and a bent end portion wherein the end portion of one of the second tines is bent at an angle $\beta_1$, relative to plane P, and the end portion of the other second tine is bent at a substantially equal and opposite angle $\beta_2$ relative to plane P.

7. The tine member of claim wherein the tip of one of the second tines is circumferentially offset by substantially 90° relative to the tip of one of the first tines.

8. The tine member of claim 6 wherein the tips of the first tines are circumferentially offset by substantially 180° and the tips of the second tines are circumferentially offset by substantially 180°.

9. The tine member of claim 4 wherein the tips of the first tines are circumferentially offset by substantially 180°.

10. The tine member of claim 1 wherein the plurality of tines further includes a second tine characterized by a generally planar shank portion lying in plane P and a bent end portion.

11. The tine member of claim 10 comprising two second tines wherein the end portion of one of the second tines is bent at an angle $\beta_1$ relative to plane P, and the end portion of the other second tine is bent at a substantially equal and opposite angle $\beta_2$ relative to plane P.

12. The tine member of claim 11 wherein $\beta_1$ is between 45° and 60°, inclusive.

13. The tine member of claim 11 wherein the tips of the second tines are circumferentially offset by substantially 180°.

14. The tine member of claim 11 wherein the plurality of tines further includes a third tine characterized by a curved shank.

15. The tine member of claim 14, including first and second pairs of third tines wherein the shank of each tine of the first pair of third tines is generally curved in a first direction relative to plane P and the shank of each tine of the second pair of third tines is generally curved in an opposite direction relative to plane P.

16. The tine member of claim 15 wherein the tips of the first pair of third tines are circumferentially offset by substantially 90°.

17. The tine member of claim 16 wherein the tips of the second pair of third tines are circumferentially offset by substantially 90°.

18. The tine member of claim 15 wherein the tip of one of the first pair of third tines is circumferentially offset from the tip of one of the second pair of third tines substantially 180°.

19. The tine member of claim 18 wherein the plurality of tines further includes a third tine characterized by a curved shank.

20. The tine member of claim 19 wherein said plurality of tines includes two of the first tines, two of the second tines, and first and second pairs of third tines.

21. The tine member of claim 20 wherein one of the first tines is bent at an angle $\alpha_1$ relative to plane P and the other one of the first tines is bent at a substantially equal and opposite angle $\alpha_2$ relative to plane P, and wherein the bent end portion of one of the second tines is bent ant an angle $\beta_1$ relative to plane P and the bent end of the other second tine is bent at a substantially equal and opposite angle $\beta_2$ relative to plane P, and wherein the shank of each tine of the first pair of third tines is generally curved in a first direction relative to plane P and the shank of each tine of the second pair of third tines is generally curved in an opposite direction relative to plane P.

22. The tine member of claim 21 herein the tips of the first tines are circumferentially offset by substantially 180°, the tips of the second tines are circumferentially offset by substantially 180°, the tips of the first pair of third tines are circumferentially offset by substantially 90°, and the tips of the second pair of third tines are circumferentially offset by substantially 90°.

23. The tine member of claim 20 wherein the tips of adjacent tines are circumferentially offset by substantially 45°.

24. The tine member of claim 20 wherein the tines are disposed in the sequence of one of the first tines, one of the first pair of third tines, one of the second tines, the other one of the first pair of third tines, the other first tine, one of the second pair of third tines, the other second tine, and the other one of the second pair of third tines.

25. The tine member of claim 1 wherein the base is disposed in a plane parallel to and spaced from plane P.

26. The tine member of claim 25 wherein the plurality of tines comprises two first tines, two second tines each characterized by a generally planar shank portion lying in plane P and a bent end portion, and first and second pairs of third tines each characterized by a curved shank.

27. The tine member of claim 26 wherein one of the first tines is bent at an angle toward the plane of the base and the other first tine is bent at an angle away from the plane of the base.

28. The tine member of claim 27 wherein the bent end portion of one of the second tines is disposed toward the plane of the base and the bent end portion of the other second tine is disposed away from the plane of the base.

29. The tine member of claim 28 wherein the shanks of each tine of the first pair of third tines is curved toward the plane of the base and the shanks of each tine of the second pair of third tines is curved away from the plane of the base.

* * * * *